July 3, 1962 W. E. TURNER 3,042,269
FRUIT JAR POURING SPOUT
Filed March 27, 1959
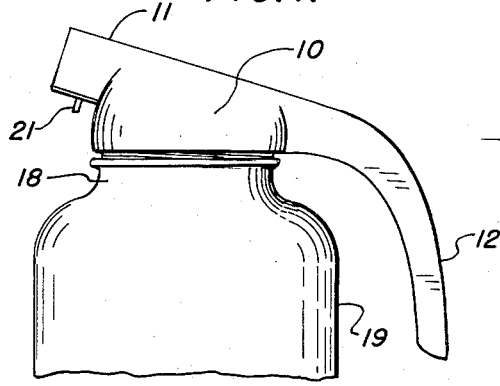
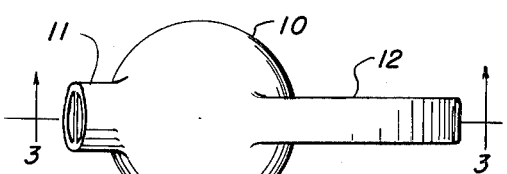
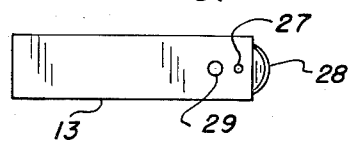
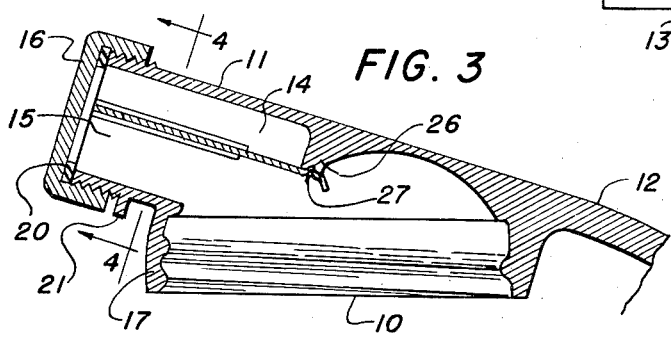
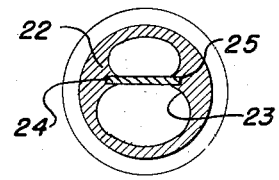
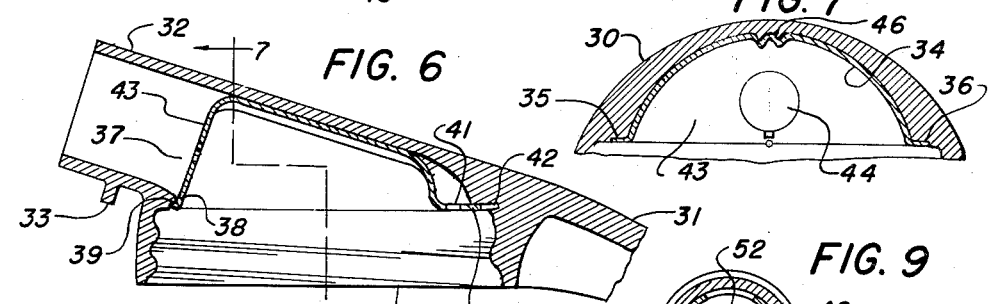
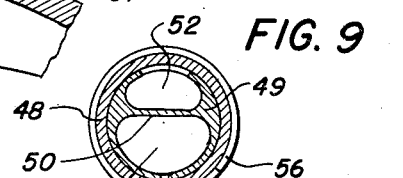
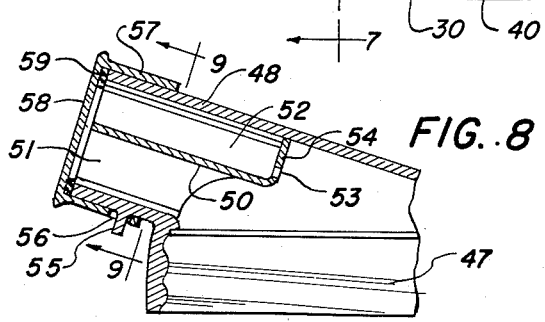
INVENTOR.
WILLIAM E. TURNER
BY Victor J. Evans & Co.
ATTORNEYS

United States Patent Office 3,042,269
Patented July 3, 1962

3,042,269
FRUIT JAR POURING SPOUT
William E. Turner, P.O. Box 142, Summerville, Ga.
Filed Mar. 27, 1959, Ser. No. 802,408
1 Claim. (Cl. 222—484)

This invention relates to caps for fruit, syrup, and other jars or containers, and in particular a cap having an angularly disposed neck with a closure on the end thereof extended from one side to facilitate pouring products from the jar, and also having a handle extended from the opposite side.

The purpose of this invention is to provide a cap or closure that may readily be threaded on a jar or other container which facilitates pouring products from the container and at the same time provides a closure therefor.

In the conventional type of fruit jar and also in similar types of containers it is difficult to pour products from the threaded neck of the jar with the caps removed particularly as the product runs into the threads and down the side of the jar. With this thought in mind, this invention contemplates a cap having a threaded flange threaded on the neck of a jar or the like and also having a spout extended from one side which facilitates pouring products from the jar or container.

The object of this invention is, therefore, to provide means for forming a cap or closure for jars or other containers in which products may be poured from a spout extended from one side thereof and in which the spout is provided with a closure cap whereby the jar or container may be sealed.

Another object of this invention is to provide a jar or container closure cap having a pouring spout at one side in which a vent is provided through the spout to relieve vacuum formed in the container as the product is poured therefrom.

A further object of the invention is to provide a container cap having a pouring spout extended from one side which is of a simple and economical construction.

With these and other objects and advantages in view the invention embodies a cap having a threaded opening extended inwardly from the lower surface with a handle extended from one side and a spout extended from the opposite side, with a closure cap on the outer end of the spout, and with means for providing a vent or inlet passage through the upper part of the spout.

Other features and advantages of the invention will appear from the following description taken in connection with the drawings wherein:

FIGURE 1 is a side elevational view showing the upper end of a container with the improved pouring cap positioned thereon.

FIGURE 2 is a plan of the pouring cap.

FIGURE 3 is a longitudinal section through the pouring cap taken on line 3—3 of FIG. 2.

FIGURE 4 is a cross section through the pouring spout of the cap taken on line 4—4 of FIG. 3.

FIGURE 5 is a detail showing a plate adapted to be inserted in the pouring spout for providing a vent passage through the spout.

FIGURE 6 is also a longitudinal section through the pouring spout illustrating a modification wherein a lining is inserted in the cap to provide means for providing a vent in the pouring passage thereof.

FIGURE 7 is a cross section through the spout shown in FIG. 6.

FIGURE 8 is a similar view also showing a longitudinal section through the spout and illustrating a modification wherein the dividing insert or lining extends inwardly from the end of the spout.

FIGURE 9 is a cross section taken on line 9—9 in FIG. 8 illustrating the dividing insert of the spout.

Referring now to the drawings wherein like reference characters denote corresponding parts the improved pouring container a cap of this invention includes a body 10 having a spout 11 extended from one side of the body, with a handle 12 extended from the opposite side of the body, a dividing plate 13 for separating a vent passage 14 from a pouring passage 15 and a cap 16 removably mounted on the outer end of the spout.

The body portion 10 of the cap is provided with an internally threaded flange 17 which is adapted to be threaded on a neck 18 of a fruit jar 19 or other container and with the parts as illustrated in FIGURES 1, 2 and 3.

The cap 16 is threaded on the outer end of the spout 11 and a gasket 20, positioned between the inner surface of the cap and end of the spout, provides sealing means for sealing the end of the container.

The lower surface of the spout 11 is provided with a projection 21 which forms a rest that engages the edge of a glass or the like when products are being poured from the container on which the cap is positioned into the glass.

A vent passage 14 in the upper part of the spout is separated from the pouring passage 15 by ribs 22 and 23 and the dividing plate 13 is retained in position by mounting the edges thereof in grooves 24 and 25 that are provided in the inner edges of the ribs 22 and 23. The plate 13 extends inwardly to a transversely disposed wall 26 and the inner end of the plate is attached to the wall by a screw 27. The inner end of the plate is also provided with a projecting lip 28 which extends downwardly from the partition. The plate 13 is also provided with a vent opening 29 to permit passage through the upper passage 14 and into the container the products of the container passing outwardly through the passage 15.

With the parts formed in this manner the conventional cap or closure is removed from a jar or the like and this is replaced by the improved cap with the flange 17 of the body 10 threaded on the neck of the jar. To use the pouring spout the cap 16 is removed whereby products are readily poured from the container.

In the design illustrated in FIGURES 6 and 7 a closure cap is provided having a body 30 with a handle 31, extended from one side, and a spout 32 extended from the other and the spout 32 is provided with a projection 33 that provides a rest for engaging the edge of a glass, similar to the projection 21, shown in FIG. 3.

In this design a liner 34, substantially semi-circular in cross section and having flanges 35 and 36 on the edges is installed in a cavity 37 in the cap. The liner 34 is provided with a groove 38 at one side which is positioned over a bead 39 and a flange 40 at the opposite side, which is provided with an opening 41, extends into a slot 42 in the body. By this means the liner is rigidly mounted in inner surface of the cap and with the end wall 43 of the liner provided with a comparatively large opening 44 products are readily poured from the container with the vacuum in the container being relieved by air passing through grooves 45 and 46 in the upper wall of the liner.

With the pouring cap formed as illustrated in FIGURES 8 and 9 a body 47 is provided with a spout 48 and an insert 49 having a dividing web 50 wherein, is frictionally retained in spout whereby products from the container on which the cap is positioned are poured through a passage 51 in the lower side of the spout as air passes inwardly through an upper passage 52 and through an opening 53 in an end wall 54, to relieve vacuum in jar or container.

The spout 48 is also provided with a projection 55 which forms a rest to engage the edge of a glass or the like for pouring products from the container and the projection 55, and also the projection 33 are positioned to extend into a bayonet slot 56 in the flange 57 or a closure cap 58 positioned on the end of the spout. As sealing washer 59 is also provided between the inner surface of the cap and end of the spout, as shown in FIGURE 8.

The pouring spout, in either of the different designs, is placed on a jar or other container in place of the conventional jar top and with the cap positioned on the end of the spout the improved jar top provides a sealed closure and the jar with the cap thereon may be placed in the ice box or in a storage cabinet.

When it is desired to use products from the jar or container the closure cap is removed from the end of the spout and products are readily poured therefrom with the vacuum in the container being relieved by air entering through the vent structure. As products are used from the jar or container the cap is removed, cleaned and placed on another jar or container.

It will be understood that modifications may be made in the design and arrangement of the parts without departing from the spirit of the invention.

What is claimed is:

In a jar top, the combination which comprises a body having an internally threaded recess for receiving a threaded neck of a container in the lower surface of the recess and with a spout extended from one side of the body and in communication with the said recess, a liner of substantially semi-circular formation positioned in said body and providing therein a pouring passage on one side of said liner and venting passages on the opposite side of said liner, said liner having outwardly extending flanges on the longitudinal edges thereof, said body having oppositely disposed aligned grooves therein for receiving the flanges of said liner, said spout having a transversely extending bead at the inner end thereof and said body having a transversely extending slot therein that is positioned in parallel alignment with the bead on said spout, said liner having a groove at one transverse edge thereof for engagement with the bead on said spout and a flange at the opposite transverse edge thereof for engagement with the slot in said body wherein said liner is retained in position in said body, said liner having a relatively large central opening therein in communication with said pouring passage and a pair of parallel longitudinally extending V-shaped grooves therein providing said venting passages for relieving the vacuum in said body, a closure positioned on the end of the spout, said closure having a flange provided with a bayonet slot therein, a handle extended from the side of the body opposite to that from which the spout extends, and said spout having a projection extended outwardly therefrom, and spaced inwardly from the outer end thereof, so that the projection is positioned to be engaged by the bayonet slot in the flange of said closure to thereby provide locking means for securing the closure cap on the end of the spout and also to engage the rim of a container into which products are poured through the spout, said spout also having threads on the outer surface thereof outwardly of the projection thereon and said closure cap having an internally threaded flange thereon adapted to be threaded on the end of the spout.

References Cited in the file of this patent

UNITED STATES PATENTS

| | | |
|---|---|---|
| Re. 2,988 | Lyman | June 16, 1868 |
| 31,866 | Breckenridge | Apr. 2, 1861 |
| 1,054,972 | Liquorish | Mar. 4, 1913 |
| 1,342,299 | Shaw | June 1, 1920 |
| 1,509,360 | Lewis | Sept. 23, 1924 |
| 2,237,810 | Casper | Apr. 8, 1941 |
| 2,306,550 | Mailey | Dec. 29, 1942 |
| 2,445,130 | Turner | July 13, 1948 |